United States Patent [19]

Barker et al.

[11] Patent Number: 5,124,367
[45] Date of Patent: Jun. 23, 1992

[54] FIRE RETARDANT COMPOSITIONS COMPRISING DISPERSION OF FIRE RETARDANT IN ISOCYANATE-REACTIVE COMPOUND WITH FATTY ACID ESTER AND/OR AMIDE AS DISPERSING AGENT

[75] Inventors: Martin C. Barker, Bertem; Malcolm Hannaby, Sterrebeek, both of Belgium

[73] Assignee: Imperial Chemical Industries PLC, London, England

[21] Appl. No.: 717,746

[22] Filed: Jun. 19, 1991

[30] Foreign Application Priority Data

Jul. 3, 1990 [GB] United Kingdom ............. 9014766

[51] Int. Cl.⁵ .................... C08K 5/10; C08K 5/20
[52] U.S. Cl. .................. 521/107; 252/182.24; 252/182.26; 252/182.27; 521/128; 521/130; 521/906
[58] Field of Search ............. 252/182.24, 182.26, 252/182.27; 521/107, 128, 130, 906

[56] References Cited

U.S. PATENT DOCUMENTS 4,293,657 10/1981 Nissen et al. ............. 521/121
4,644,015 2/1987 Scaccia et al. ............ 521/128

*Primary Examiner*—Maurice J. Welsh
*Assistant Examiner*—Rachel Johnson

[57] ABSTRACT

A fire retardant composition comprising a dispersion of a solid fire retardant additive in a liquid isocyanate-reactive compound having a functionality of from 2 to 8 and an average equivalent weight of from about 31 to about 5000 and, as anti-settling agent, an effective amount of a fatty acid ester and/or amide. The composition is useful for preparing polyurethane foams.

10 Claims, No Drawings

FIRE RETARDANT COMPOSITIONS COMPRISING DISPERSION OF FIRE RETARDANT IN ISOCYANATE-REACTIVE COMPOUND WITH FATTY ACID ESTER AND/OR AMIDE AS DISPERSING AGENT

This invention relates to fire retardant compositions and more particularly to stabilised dispersions of solid fire retardant additives in isocyanate-reactive polymers and to the use of such compositions in the production of fire retardant polyurethane foams.

The production of useful polymeric materials by reacting organic polyisocyanates with isocyanate-reactive polymers such as polyols and polyamines is well known. The materials produced in this way include flexible polyurethane foams, which are widely used as cushioning and padding materials by the furniture, bedding and vehicle industries, and rigid polyurethane foams, which are widely used as insulating materials.

In order to reduce the flammability of polyurethane foams, it has been proposed to incorporate fire retardant additives in the foam formulation. Such additives may be liquids such as tris chloroethyl phosphate or solids such as melamine, the inclusion of melamine in flexible foam formulations having been described in U.S. Pat. No. 4,258,141 and in GB No. 2163762 and GB No. 2177406.

The inclusion of liquid fire retardant additives in the foam formulation is usually effected by pre-blending with one or other of the reactive foam precursors, that is to say the polyol or the polyisocyanate, which themselves are usually liquids at normal temperatures. In the case of solid additives, however, dispersion in a liquid component is necessary and difficulty is experienced in the production of storage-stable dispersions of the solid materials in either the polyol or the polyisocyanate. Because of differences in density between the solids and the liquid precursors, and also the relatively low viscosities of the latter, settling out of the solid additive takes place resulting in foam components of non-uniform composition and the possibility of blocked lines.

It has now been found that the difficulties hitherto experienced in the production of storage-stable dispersions of solid fire retardant additives in the polyols and other isocyanate-reactive polymers used as polyurethane foam precursors may be minimised by the incorporation of anti-settling agents as hereinafter defined.

Accordingly, the invention provides a fire retardant composition comprising a dispersion of a solid fire retardant additive in a liquid isocyanate-reactive compounds polymer having a functionality of from 2 to 8 and an average equivalent weight of from about 31 to about 5000 and, as anti-settling agent, an effective amount of a fatty acid ester and/or amide.

Solid fire retardant additives which may be present in the compositions of the invention include antimony compounds, for example antimony oxides and antimony trihalides, boron compounds, for example borax, boric acid, zinc borate and ammonium fluoroborate, alumina trihydrate, magnesium hydroxide, ammonium molybdate, molybdenum oxides, expandable graphite and, especially, ammonium polyphosphate, cyanic acid derivatives such as cyanamide, dicyandiamide, guanidine, guanidine carbonate, biguanidine, cyanuric acid and solid esters thereof and, particularly, melamine.

The compositions of the invention may contain one or more fire retardant additives. Thus, if desired, the compositions can contain a mixture of a solid fire retardant additive and at least one other solid fire retardant additive and/or at least one liquid fire retardant additive. Examples of liquid fire retardants which may optionally be present in the compositions of the invention include tris-2-chloroethyl phosphate, tris chloropropyl phosphate, tricresyl phosphate and tris-2,3-dibromopropyl phosphate.

The amount of solid fire retardant additive which may be present in the compositions of the invention should be appropriate to the fire retardant effect it is desired to achieve in the ultimate polymer and this may be determined by trial. Typical compositions contain from about 2 to about 70% by weight of solid fire retardant based on the weight of isocyanate-reactive compound in which it is dispersed although compositions containing smaller or larger amounts can also be useful.

Typical compositions for use in flexible foam formulations preferably contain from 5 to 50% and most preferably from 5 to 30% by weight of solid fire retardant, whereas masterbatches for subsequent dilution to compositions for use in flexible foam formulations preferably contain from 10 to 70%, most preferably from 30 to 70% by weight solid fire retardant on the weight of isocyanate-reactive compound.

Typical compositions for use in rigid foam formulations preferably contain from 2 to 30% by weight of solid fire retardant, whereas master batches for use in rigid foam formulations preferably contain from 10 to 70% by weight of solid fire retardant on the weight of isocyanate-reactive compound.

When other solid fire retardants are used, the amount present in the fire retardant composition can be much greater, for example up to 250% by weight based on the isocyanate-reactive compound.

The particle size of the solid fire retardant additive may vary but melamine and ammonium polyphosphate are preferably employed in a finely divided form, typically having an average particle size of not more than about 100 microns.

The isocyanate-reactive compound in which the solid fire retardant is dispersed may contain isocyanate-reactive groups selected from, for example, hydroxyl, primary and secondary amino, thiol, carboxy, imino and/or enamino groups but is preferably a polyol having an average nominal hydroxyl functionality of from 2 to 8 and an average hydroxyl equivalent weight of from about 31 to about 5000.

The term "nominal hydroxyl functionality" used in relation to the polyol refers to the hydroxyl functionality that a polyol would be expected to have having regard to its monomeric components. For example, a polyether polyol prepared by the addition of propylene oxide to a glycol will have a nominal hydroxyl functionality of 2 although, in fact, its average functionality may be somewhat less than 2.

Thus, for a polyether polyol, the average nominal hydroxyl functionality is the average functionality (number of active hydrogen atoms) of the initiator or initiators used in its preparation.

For the preparation of flexible foams suitable isocyanate-reactive compounds are polymers having a functionality of from 2 to 6 and an average equivalent weight of from about 500 to about 5000.

The average nominal functionality of the isocyanate-reactive polymer is preferably 2 to 4 and more preferably 2 to 3. preferred average equivalent weights lie in the range from 750 to 4000, for example from 1000 to 3000. Mixtures of two or more polymers varying in functionality, equivalent weight and/or polymer backbone may be used provided such mixtures conform to the average functionality and average equivalent weight criteria specified herein. Polyols are a typical example of suitable isocyanate-reactive polymers for the preparation of flexible foams.

For the preparation of rigid foams, suitable isocyanate-reactive compounds, especially polyols, in general have a molecular weight of 62 to 1500 and a functionality of 2-8, especially 3-8.

Polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Typical initiator compounds for flexible foam applications contain a plurality of active hydrogen atoms and include water, ammonia, polyols, for example ethylene glycol, propylene glycol, diethylene glycol, cyclohexane dimethanol, resorcinol, bisphenol A, glycerol, trimethylolpropane, 1,2,6-hexanetriol, triethanolamine, pentaerythritol or sorbitol, amines, for example aniline, ethylene diamine, tolylene diamine, diaminodiphenylmethane or polymethylene polyphenylene polyamines and amino-alcohols, for example ethanolamine or diethanolamine. Mixtures of initiators and/or cyclic oxides may be used. Especially useful polyether polyols for flexible foam applications include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10-80%, block copolymers having oxyethylene contents of up to 25% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran. Typical initiators for rigid foam applications include polyols, for example glycerol, trimethylopropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and di ®thanolamine, and mixtures of such initiators.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(isobutylene) polyols. Suitable polysiloxane polyols include polydimethyl-siloxane diols and triols.

Other polyols which may be used comprise dispersions or solutions of addition or condensation polymers in polyols of the types described above. Such modified polyols have been fully described in the prior art and include products known as polymer polyols obtained by the in situ polymerisation of one or more vinyl monomers, for example styrene and/or acrylonitrile, in polymeric polyols, for example polyether polyols. Further modified polyols include products obtained by the in situ reaction between a polyisocyanate and an amino- or hydroxy-functional compound, for example an alkanolamine such as triethanolamine, or a hydrazine or hydrazide, in a polymeric polyol, suitable products having been described in EP-A-0 079 115 and in GB-A-2 072 204.

Other isocyanate-reactive compounds in which the solid fire retardant may be dispersed include polyamines. Suitable polyamines and methods for their preparation have been fully described in the prior art and include aromatic polyamines and polymeric polyamines, especially diamines and triamines corresponding to the above described polyols. The polyamines include products obtained by the reductive amination of polyether polyols as described, for example, in U.S. Pat. No. 3,654,370 or by the cyano-ethylation of polyols followed by hydrogenation. Polyoxypropylene diamines and triamines and mixtures thereof are preferred. Also useful are polymers containing both amino and hydroxyl groups obtained by the partial amination of polyols, and combinations of polyols and polyamines.

Still further isocyanate-reactive polymers in which the solid fire retardant may be dispersed include the imino-functional polymers disclosed as soft block components in U.S. Pat. No. 4,794,129 and corresponding enamine terminated polymers.

The anti-settling agent present in the compositions of the invention is an ester or amide of a fatty acid, for example fatty acids having from 6 to 35 carbon atoms. Mixtures of esters and amides can be used.

Fatty acid esters which may be used include castor oil derivatives, for example hydrogenated castor oil which may be used alone or in admixture with other materials, for example fatty acid amides Thus, a mixture of hydrogenated castor oil and the ethylene diamine bis-amide of 12-hydroxystearic acid, for example a 3:1 mixture, is effective. Suitable materials are available from Henkel under the name "Rilanit" Special Micro, from ICI under the name "Thixomen" and from Perchem Limited under the name "Perchem" XT.

Suitable amounts of anti-settling agent are generally within the range from about 0.05 to about 5%, especially 0.1 to 1%, by weight based on the weight of isocyanate-reactive polymer.

The fire retardant compositions of the invention may be prepared in any convenient manner using conventional mixing means appropriate for dispersing a solid in a liquid, for example a high shear mixer. Dispersion of the solid fire retardant additives may be performed at any temperature at which the dispersant medium is liquid, but heating to a temperature of 50° to 90° C. during dispersion is preferred. The solid fire retardant additive, the isocyanate-reactive compound and the anti-settling agent may be mixed together in one operation or the anti-settling agent may be blended into a pre-mix of the isocyanate-reactive compound and fire retardant. In a further variant, a pre-mix of fire retardant and anti-settling agent is blended into the isocyanate-reactive compound. If desired, master batches can be prepared containing high concentrations of fire retardant and appropriate amounts of anti-settling agent in the isocyanate-reactive compound, the master batches subsequently being combined with isocyanate-reactive compound containing a smaller or zero concentration of fire retardant.

The storage stability of the compositions of the invention varies widely depending upon the actual components present in any given composition. In all cases, the presence of the fatty acid ester or amide provides a significant improvement, the stability of individual compositions varying from several hours to several months.

The fire retardant compositions of the invention contain free isocyanate-reactive groups and accordingly may be reacted with isocyanate-containing compositions to form fire resistant polyurethane, polyurea and other useful polymeric materials.

The compositions of the invention are particularly suitable for use in the manufacture of fire resistant flexible foams and rigid foams. Thus, a fire retardant composition of the invention may be interacted with an organic polyisocyanate and water as blowing agent in the presence as necessary of other isocyanate-reactive materials and conventional additives.

Organic polyisocyanates with which the fire retardant compositions may be reacted include aliphatic, cycloaliphatic and araliphatic polyisocyanates but especially those aromatic polyisocyanates, for example tolylene diisocyanate (TDI) and diphenylmethane diisocyanate (MDI) conventionally used in the manufacture of flexible foams.

Preferred polyisocyanates are diphenylmethane diisocyanate compositions, especially compositions which are liquids at normal room temperatures. Suitable polyisocyanates therefore include liquid mixtures of MDI isomers, especially mixtures containing the 4,4'-isomer together with not more than 60% of the 2,4'-isomer and not more than 5% of the 2,2'-isomer, said components being expressed as weight percentages of the total composition.

Further diphenylmethane diisocyanate compositions which may be used include compositions containing polymethylene polyphenylene polyisocyanates. Thus, mixtures may be used containing at least 70% by weight of pure MDI (4,4'-isomer or isomer mixture) and up to 30% by weight of the so-called polymeric MDI containing from 25 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Other MDI compositions which may be used include modified forms of MDI, that is to say MDI modified in known manner by the introduction of, for example, urethane, allophanate, urea, biuret, carbodiimide, uretonimine or isocyanurate residues. Other modified forms of MDI which may be used include polyurea dispersions in MDI such as have been described, for example in EP-A-0 103 996.

Still further diphenylmethane diisocyanate compositions which may be used include mixtures of the above described MDI isomers, isomer mixtures, modified MDI and the like and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially aromatic polyisocyanates such as tolylene and phenylene diisocyanates.

Conventional additives of flexible foam formulations and rigid foam formulations include inert volatile blowing agents, for example low boiling halocarbons, catalysts, for example tertiary amines and tin compounds, surface-active agents and foam stabilisers, for example siloxane-oxyalkylene copolymers, chain extenders, for example low molecular weight diols, diamines and diimines, crosslinking agents, for example triethanolamine, organic and inorganic fillers, pigments and internal mould release agents.

Thus, as a further aspect of the invention, there is provided a reaction system for use in the manufacture of fire resistant foam, said reaction system comprising:
 (i) a fire retardant composition comprising a dispersion of a solid fire retardant additive in a liquid isocyanate-reactive compound, preferably a polyol, having a functionality of from 2 to 8 and an average equivalent weight of from about 31 to about 5000 and, as anti-settling additive, an effective amount of a fatty acid ester and/or amide;
 (ii) an organic polyisocyanate;
 (iii) water, and optionally
 (iv) one or more of the additives known per se in foam formulations.

Moulded, sprayed or slabstock foam may be prepared from the compositions of the invention using conventional machinery and continuous or discontinuous production techniques including frothing.

An unexpected benefit of the invention is the superior fire resistance, by oxygen index determination and by other fire-tests such as the standard test BS 5852, of the derived foams (in particular flexible foams) relative to foams obtained from fire retardant compositions not containing anti-settling agents.

The invention is illustrated but not limited by the following Examples in which parts are by weight unless indicated otherwise.

In the examples the following references are used to designate the various components:

GLOSSARY

Polyol A - A poly(propylene oxide) polyether polyol with 17.2% ethylene oxide tip of number average molecular weight 4800 and nominal average functionality 3.0

Polyol B - A poly(propylene oxide) polyether polyol with 30% ethylene oxide randomly distributed along the chain and a 10% ethylene oxide tip of number average molecular weight 4700 and nominal average functionality 3.0

Polyol C - Polyoxypropylene polyol of hydroxyl value 440 mg KOH/g and nominal number average functionality of 4.5 Available as Daltolac P18O from ICI Polyurethanes.

Polyol D - a poly(ethylene oxide) polyether polyol with 25% polypropylene oxide randomly distributed along the chain of number average molecular weight 5000 and a nominal average functionality of 3.

Catalyst A - The catalyst used was a standard combination of tertiary amines and amine salts.

Catalyst B - N,N- dimethyl cyclohexyl amine

Melamine - Melamine used was supplied by SKW Trostberg, FRG

Ammonium Polyphosphate - available as Tolgard APP from Tenneco Organics Ltd

Anti-settling Agent A - A hydrogenated castor oil derivative Rilanit Special Micro from Henkel Anti-settling Agent B - An amide modified hydrogenated castor oil: Thixomen from ICI Resins Surfactant - A siloxane surfactant Tegostab B8406 from Th. Goldschmidt AG Blowing agent - Trichloromonofluoro methane: Arcton 11 from ICI Chemicals and Polymers TCPP - Tris(beta-chloropropyl) phosphate supplied as Fyrol PCF by AKZO Isocyanate A - An isocyanate prepolymer from Imperial Chemical Industries (PBA 2189) a blend of a polyol modified MDI and polymeric MDI, with a resulting —NCO content of 26.6

Isocyanate B - Polymeric MDI sold as Suprasec DNR by ICI Polyurethanes (isocyanate content 30.7%).

EXAMPLES 1-3

In these examples polyol and water were premixed at a temperature of 70° C. by means of an air driven turbine stirrer until thoroughly blended. The mixture was cooled at room temperature and than the additives were incorporated. This mixture was stable against settling out of the melamine for more than 3 months. The mixture was charged into a polyol tank of a flexible foam dispensing unit. This mixture and polyisocyanate were combined by impingement mixing and poured into a mould which was then closed. The foams were allowed to cure for 24 hours. Pads of 10×10×5 cm were then cut from the centre of the bun for testing. Using this procedure flexible polyurethane foams were prepared using the formulations listed herebelow.

|  | Example 1 | Example 2 | Example 3 |
|---|---|---|---|
| Polyol A | 50 | 50 | 50 |
| Polyol B | 50 | 50 | 50 |
| Water | 5 | 5 | 5 |
| Catalyst A | 1.1 | 1.1 | 1.1 |

-continued

|  | Example 1 | Example 2 | Example 3 |
|---|---|---|---|
| Anti-settling |  |  |  |
| Agent A | 1.34 | — | — |
| Agent B | — | 1.34 | 0.67 |
| Melamine | 26.6 | 26.6 | 26.6 |
| Isocyanate A | 67.0 | 67.0 | 66.7 |

Ratio of polyol/polyisocyanate: 100/50 w/w

The properties of the obtained foams are stated in the following table:

|  | Example 1 | Example 2 | Example 3 |
|---|---|---|---|
| Core density (kg/m$^3$) | 46 | 46.5 | 49.6 |
| L.O.I. (% O$_2$) | 27.4 | 29 | 29.3 |
| BS 5852 Test (pass or fail) | pass | pass | pass |
| Burn out time (minutes:seconds) | 4:10 | 3:35 | 3:45 |

EXAMPLES 4-5

Using the same procedure as for Examples 1-3 flexible foams were prepared using the formulations listed herebelow

|  | Example 4 | Example 5 |
|---|---|---|
| Polyol A | 50 | 50 |
| Polyol B | 50 | 50 |
| Water | 4.6 | 4.5 |
| Catalyst A | 1.1 | 1.1 |
| Anti-settling Agent B | 0.69 | 1.56 |
| Melamine | 33.6 | 53.5 |
| Polyol D | — | 2.0 |
| TCPP | 3.9 | 3.9 |
| Isocyanate A | 61.9 | 80.0 |
| Ratio of polyol/ Polyisocyanate (w/w) | 100/43 | 100/48 |

The properties of the obtained foams are stated in the following table:

|  | Example 4 | Example 5 |
|---|---|---|
| Core density (kg/m$^3$) | 50 | 55 |
| Fire test |  |  |
| Boston Chair* type | pass | pass |
| California technical bulletin 133+ type | pass | pass |

*Tests were carried out according to the Boston Fire Department procedure for approval of upholstered furniture using a chair mock-up without a fabric covering.
+Tests were carried out according to the State of California, Department of Consumer Affairs, Bureau of Home finishing and thermal insulation, Technical Bulletin 133 using a chair mock-up without a fabric covering.

EXAMPLES 6-8

In these Examples polyol, water and additives were premixed at a temperature of 70° C. by intensive high shear mixing on a Silverson L 2 R unit for 5 minutes. The dispersions were allowed to cool by storage at room temperature and showed no separation after 2 weeks.

Rigid foam samples were prepared by standard hand mixing the polyol dispersion with the polyisocyanate using the formulations listed herebelow.

|  | Example 6 | Example 7 | Example 8 |
|---|---|---|---|
| Polyol dispersion consisting of: | | | |
| Polyol C | 200 | 200 | 200 |
| Catalyst B | 4 | 4 | 4 |
| Surfactant | 3 | 3 | 3 |
| Blowing Agent | 40 | 40 | 40 |
| Ammonium Polyphosphate | 10 | 20 | 30 |
| Antisettling Agent C | 1 | 1 | 1 |
| Water | 4 | 4 | 4 |
| Isocyanate B | 245 | 245 | 245 |

The properties of the obtained foams are stated in the following table:

|  | Example 6 | Example 7 | Example 8 |
|---|---|---|---|
| Closed-cell content (%) | 92 | 93 | 90 |
| L.O.I "Oxygen Index" (% O$_2$) | 23.2 | 24.4 | 25.3 |

We claim:

1. A fire retardant composition comprising a dispersion of a solid fire retardant additive in a liquid isocyanate-reactive compound having a functionality of from 2 to 8 and an average equivalent weight of from about 31 to about 5000 and, as anti-settling agent, an effective amount of a fatty acid ester and/or amide.

2. A composition according to claim 1 wherein the fire retardant additive comprises melamine and/or ammonium polyphosphate.

3. A composition according to claim 1 containing from 2 to 70% by weight of solid fire retardant, based on the weight of isocyanate-reactive compound.

4. A composition according to claim 1 wherein the isocyanate-reactive compound comprises a polyether polyol.

5. A composition according to claim wherein the anti-settling agent comprises an ester or amide of a fatty acid having from 6 to 35 carbon atoms.

6. A composition according to claim 1 wherein the anti-settling agent comprises a castor oil derivative.

7. A composition according to claim 1 wherein the anti-settling agent comprises hydrogenated castor oil.

8. A composition according to claim 1 containing from 0.05 to 5% by weight of anti-settling agent based on the weight of isocyanate-reactive polymer.

9. A composition according to claim 1 containing from 0.1 to 1% by weight of anti-settling agent based on the weight of isocyanate-reactive polymer.

10. A method for the manufacture of fire resistant foams which comprises interacting:
   (i) a fire retardant composition comprising a dispersion of a solid fire retardant additive in a liquid isocyanate-reactive polymer having a functionality of from 2 to 6 and an average equivalent weight of from about 500 to about 5000 and, as anti-settling additive, an effective amount of a fatty acid ester and/or amide;
   (ii) an organic polyisocyanate;
   (iii) water, and optionally
   (iv) one or more of the additives known per se in flexible foam formulations.

* * * * *